United States Patent [19]
Kunimoto et al.

[11] Patent Number: 5,175,818
[45] Date of Patent: Dec. 29, 1992

[54] COMMUNICATION INTERFACE FOR INDEPENDENTLY GENERATING FRAME INFORMATION THAT IS SUBSEQUENTLY STORED IN HOST MEMORY AND SENT OUT TO TRANSMITTING FIFO BY DMA

[75] Inventors: Masao Kunimoto; Kenji Kawakita, both of Yokohama; Kenichi Kimura, Onojo, all of Japan

[73] Assignee: Hitachi, Ltd., Tokyo, Japan

[21] Appl. No.: 313,601

[22] Filed: Feb. 21, 1989

[30] Foreign Application Priority Data

Feb. 23, 1988 [JP] Japan .................................. 63-40171

[51] Int. Cl.⁵ ........................................ G06F 13/38
[52] U.S. Cl. .................................. 395/200; 364/238.3; 364/242.3; 364/239.2; 364/239.7; 364/239.51; 364/260.1; 364/284.4; 364/939.5; 364/939.3; 364/927.99; 364/932.8; 364/DIG. 1; 364/929; 364/238.5; 364/DIG. 2; 370/60; 395/250
[58] Field of Search ... 364/200 MS File, 900 MS File; 370/60; 395/200, 250

[56] References Cited

U.S. PATENT DOCUMENTS

| | | | |
|---|---|---|---|
| 4,413,319 | 11/1983 | Schultz | 364/200 |
| 4,441,162 | 4/1984 | Lillie | 364/900 |
| 4,447,871 | 5/1984 | Terada et al. | 364/200 |
| 4,538,224 | 8/1985 | Peterson | 364/200 |
| 4,672,543 | 6/1987 | Matsui et al. | 364/200 |
| 4,777,595 | 10/1988 | Strecker et al. | 364/200 |
| 4,864,495 | 9/1989 | Inaba | 364/200 |
| 4,939,741 | 7/1990 | Miyazaki | 371/37.1 |
| 4,942,515 | 7/1990 | Marzucco et al. | 364/200 |
| 4,989,135 | 1/1991 | Miki | 364/200 |

OTHER PUBLICATIONS

Masako Maruyama, et al., "Development of X.25 LAPB Handling LSI", Papers of Technical Group on Switching Engineering, Inst. of Electronics, Information and Communication Engineers of Japan, SE87-99 (Oct. 16 1987). (English Translation of Abstract Provided).

Primary Examiner—Thomas C. Lee
Assistant Examiner—Ken S. Kim
Attorney, Agent, or Firm—Fay, Sharpe, Beall, Fagan, Minnich & McKee

[57] ABSTRACT

A communication system including a communication control unit connected through a communication line to a different system, a high-ranking processor for control of the communication control unit, and a common memory used for transfer of data between the high-ranking processor and the communication control unit. The communication control unit includes a direct memory access controller and a line controller interconnected via a transmission-only path and a reception-only path. The communication control unit autonomously generates an information frame and stores it in the common memory. The direct memory access controller then reads the information frame and transfers it to the line controller via the transmission-only path in order to transmit the information frame to the different system.

8 Claims, 2 Drawing Sheets

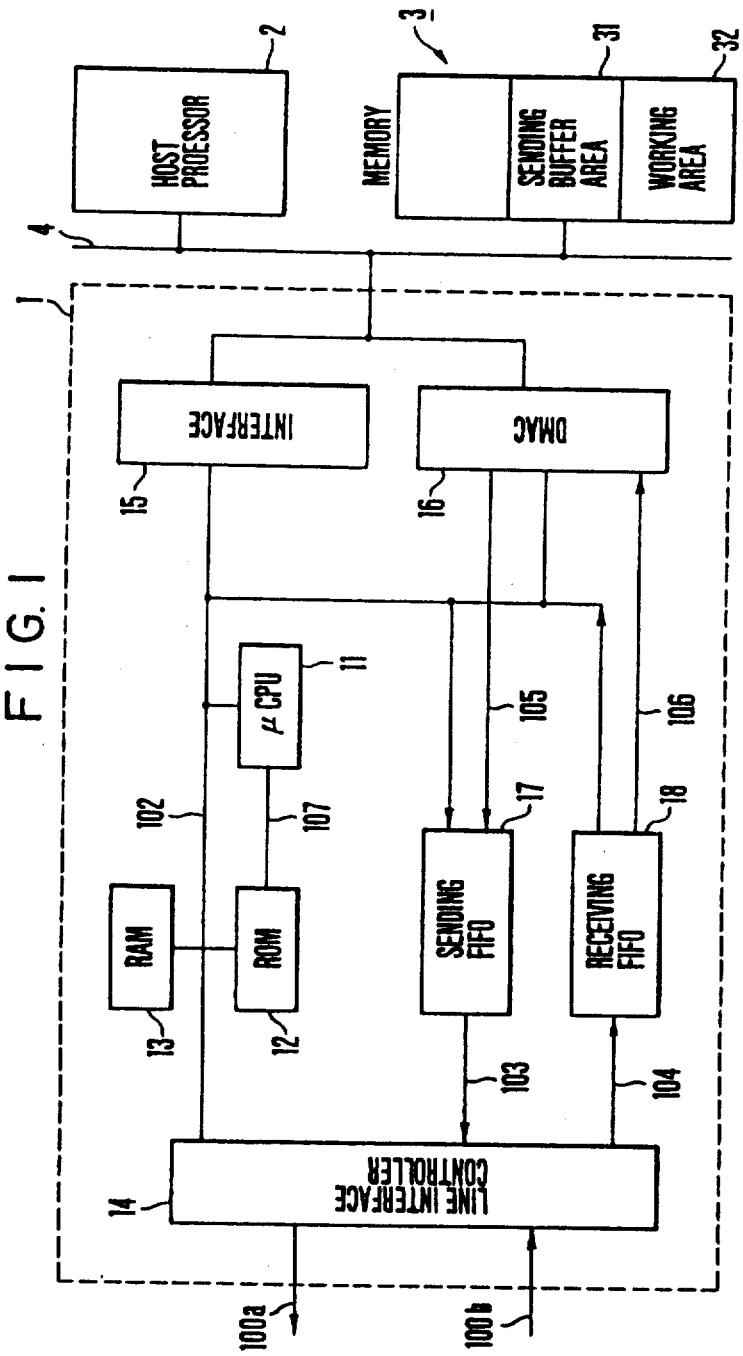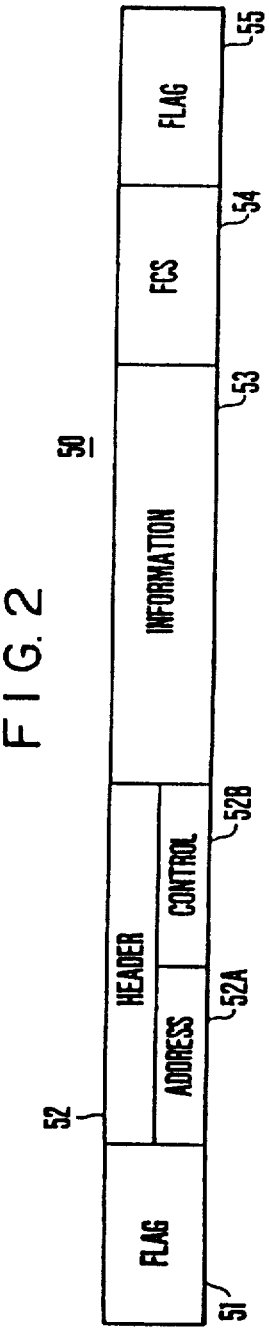

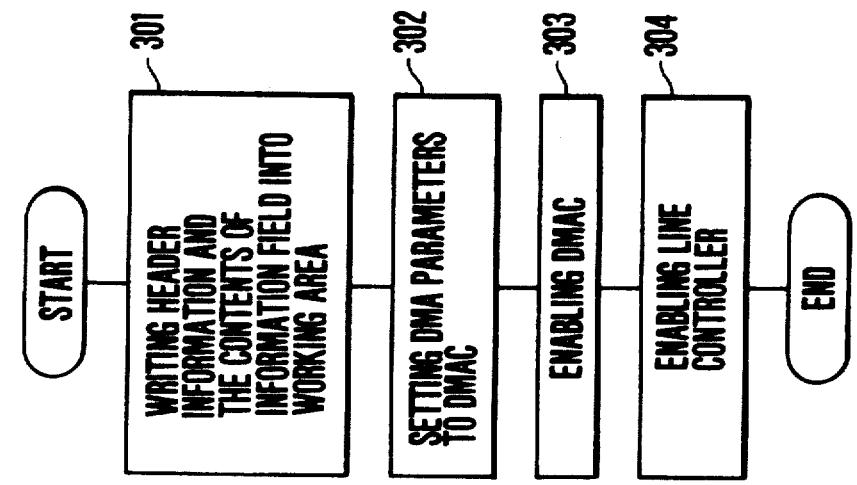
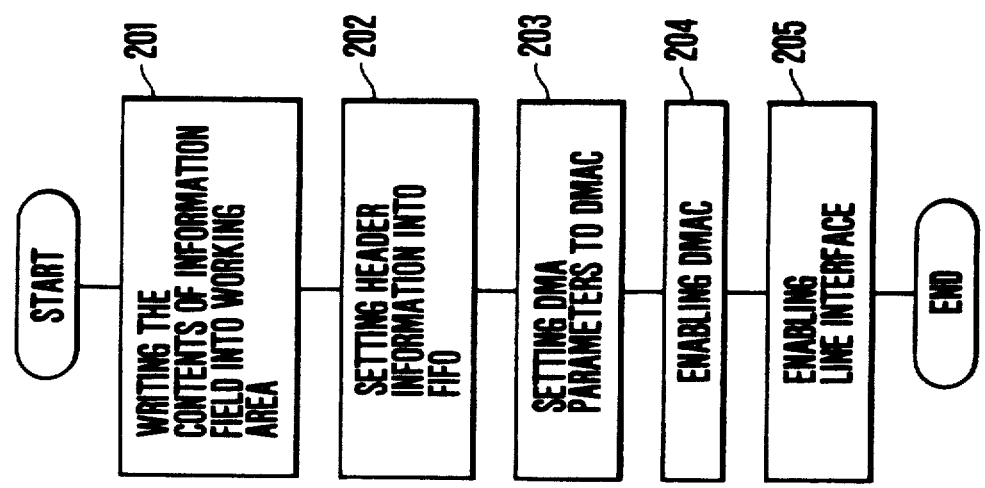
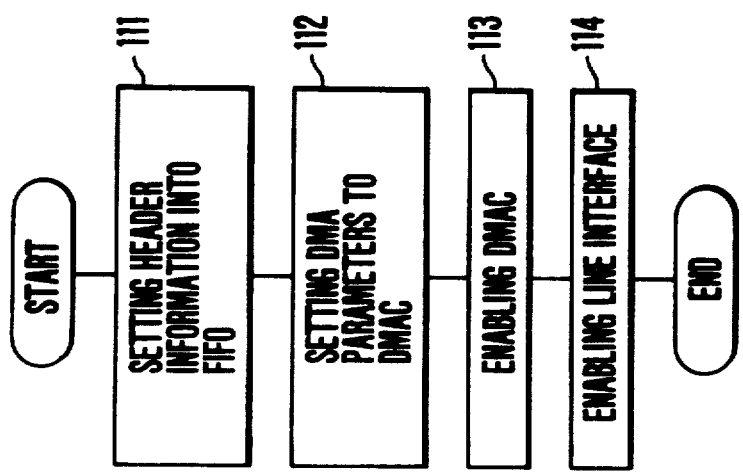

COMMUNICATION INTERFACE FOR INDEPENDENTLY GENERATING FRAME INFORMATION THAT IS SUBSEQUENTLY STORED IN HOST MEMORY AND SENT OUT TO TRANSMITTING FIFO BY DMA

BACKGROUND OF THE INVENTION

The present invention relates to communication frame sending methods and communication systems, and more particularly to such methods and systems suitable for a communication control unit, intervening between a high-ranking or host processor and a communication line, to autonomously generate an information field and send it to the communication line.

There are two kinds of frames that the communication control unit sends to the communication line:

a frame (a first kind of frame) which is read by the communication control unit from an information field section prepared beforehand in a memory outside the communication control unit by the high-ranking processor and sent to the communication line in accordance with a frame sending requirement by the high-ranking processor; and a frame (a second kind of frame) which is all autonomously generated and sent by the communication control unit.

The present invention is especially concerned with a system for sending the second kind of frame.

In a conventional communication control unit, the transmission of the first kind of frame is performed as described, for example, in Papers of Technical Group on Switching Engineering, Inst. of Electronics, Information and Communication Engineers of Japan, SE 87-99 "Development of X.25 LAPB handling LSI". namely, in response to the transmission requirement from the high-ranking processor, the communication control unit loads the header portion (an address field and a control field) of a frame to be transmitted in a FIFO (First-In First-Out buffer) provided in the communication control unit and enables a direct memory access (DMA) transfer in order to read the contents of the information field in the external memory into the FIFO.

The second kind of frames all of which are generated by the communication control unit have substantially no information field or an information field of a length of about several bytes, if any. Therefore, the conventional communication control unit employs the following methods or systems:

(i) A communication system which omits the starting of the DMA transfer in the process of transmission of the first kind of frames. A microprocessor ($\mu$CPU) in the communication control unit has stored in the sending FIFO all of the frames which it has generated, and then starts the transmission of the frames to a line interface (or serial interface) controller:

(ii) A system which has no sending FIFO in the communication control unit. A $\mu$CPU in the communication control unit sends to the line interface controller a frame generated by the $\mu$CPU, sequentially byte by byte or unit data by unit data, unit data being larger than one byte.

(iii) A communication system in which special-purpose hardware sequentially transfers the data generated by the $\mu$CPU instead of the $\mu$CPU in (ii).

If the communication control unit is intended to have a higher function in which part of the generation of an information field which is the function of the conventional high-ranking processor is performed in the communication control unit, and a frame having an information field is autonomously generated and sent in order to alleviate the load on the high-ranking processor, the conventional frame communication systems have the following problems:

The conventional system (i) is suitable for the communication control unit to generate a short frame including no information fields and to send it. However, if the communication control unit is intended to generate and transmit a long communication frame of an information field in this system, the maximum length of a transmittable frame is limited by the length of the sending FIFO and a frame longer than the sending FIFO cannot be sent. If the length of the sending FIFO is increased in order to increase the maximum length of the transmittable communication frame, a quantity of hardware in the communication control unit would be undesirably increased.

In the conventional system (ii), the $\mu$CPU transfers all the data of the communication frame, so that the load to be processed will increase. If the $\mu$CPU has continuously performed other processing having a high priority such as interrupt processing, the transfer of data to be transmitted is delayed and a transmission under run is undesirably likely to occur.

The conventional system (iii) has the problem that a quantity of hardware required for the communication control unit will increase. Especially, if the whole communication control unit including the FIFO, DMA controller and $\mu$CPU is constituted on the same semiconductor substrate as one chip in order to miniaturize the communication control unit, it is desirable to suppress an increase in the quantity of hardware as much as possible.

SUMMARY OF THE INVENTION

It is an object of the present invention to provide a communication frame sending method and system suitable for the communication control unit to autonomously generate and send a long frame having an information field without increasing significantly a quantity of hardware necessary for the communication control unit and the load on the $\mu$CPU to be processed.

In order to achieve the above object, the communication system according to the present invention comprises:

a communication control unit connected to a communication line;

a high-ranking processor connected via a bus to the communication control unit; and a common memory connected to the bus and accessed by the communication control unit and the high-ranking processor in order to transfer data.

the communication control unit including a microprocessor and a direct memory access controller (DMAC). When the communication control unit autonomously sends a communication frame to the communication line without any instructions from the high-ranking processor, the microprocessor writes the main portion of the information constituting the communication frame in a predetermined area of the common memory, and the direct memory access controller reads the written main portion of the information. When the high-ranking processor sends a communication frame to the communication line via the communication control unit, the DMAC reads the main portion of the information constituting the communication frame written in the common memory by the high-ranking processor.

In more detail, the communication control unit includes a line interface controller connected to the communication line and a transmission and a reception paths provided between the line interface controller and the DMAC. Each of transmission and reception paths is composed, for example, of a FIFO of a predetermined data storage capacity (or length).

According to the present invention, the main portion, for example an information field, of a communication frame autonomously generated and sent by the communication control unit is temporarily written into the common memory outside the communication control unit and read by the DMAC to the transmission path in the same manner as the information field written by the high-ranking processor is read, so that the maximum length of the communication frame is not limited by the data capacity of hardware within the communication control unit.

The foregoing and other objects, advantages, manner of operation and novel features of the present invention will be understood from the following detailed description when read in connection with the accompanying drawings.

BRIEF DESCRIPTION OF THE DRAWINGS

FIG. 1 is a block diagram of a communication system according to the present invention;

FIG. 2 illustrates the format of a communication frame;

FIG. 3 is a flowchart of a program showing the operation of the communication control unit performed when the communication frame is sent in accordance with instructions from the high-ranking processor;

FIG. 4 is a flowchart of a program showing a first embodiment of the transmission of a communication frame performed autonomously by the communication control unit; and FIG. 5 is a flowchart of a program showing the transmission of a communication frame performed autonomously by the communication control unit.

DESCRIPTION OF THE PREFERRED EMBODIMENTS

FIG. 1 illustrates the structure of the whole communication system according to the present invention which transmits/receives a communication frame in accordance with a predetermined communication protocol. In FIG. 1, reference numeral 1 denotes a communication control unit; 2, a high-ranking processor connected to the communication control unit 1 via a bus 4; and 3, a memory connected to the bus 4 for transferring data between the high-ranking processor 2 and the communication control unit 1.

The communication control unit 1 includes a line interface (serial interface) controller 14, a $\mu$CPU 11 which performs control operations within the communication control unit 1, a ROM 12 in which a series of instructions executed by the $\mu$CPU 11 is stored, a RAM 13 used as a working area when the $\mu$CPU 11 generates a frame to be sent, a sending FIFO 17 in which sent frame data is stored temporarily, a receiving FIFO 18 storing received frame data temporarily, an interface 15 which transfers data between the high-ranking processor 2 and the communication control unit 1, a DMA controller (hereinafter referred to as "DMAC") 16 which transfers data between the memory 3 and a respective one of the sending FIFO 17, receiving FIFO 18 and an internal bus 102, and internal buses 102-107.

Within the communication control unit, there is a first path comprising the sending FIFO 17 and bus 103 connected between the line interface controller 14 and the DMAC 16, and a second path comprising the receiving FIFO 18 and bus 104. Elements 11-18 are interconnected through the bus 102.

The line interface controller 14 is connected via a sending line 100a and a receiving line 100b to another system (not shown) such that a communication frame 50 shown in FIG. 2 is transmitted and received therebetween.

As shown in FIG. 2, the communication frame 50 includes a flag 51 indicative of the start of the frame, a header portion 52, an information field 53, a frame check sequence (FCS) 54, and a flag 55 indicative of the end of the frame.

The header portion 52 includes an address field 52A and a control field 52B indicative of the kind of the frame, etc. The fields 51, 54 and 55 are generated and added automatically by the line interface controller 14 at frame transmission. The header portion 52 is generated and added automatically by the $\mu$CPU 11. The information field 53 is generated by the high-ranking processor 2 or the $\mu$CPU 11.

The memory 3 includes a sending buffer area 31 for serving a plurality of sending buffers in which data (the contents of information field 53) to be transmitted is beforehand stored in preparation for a requirement for the transmission of data by the high-ranking processor 2 to the communication control unit 1, and a working area 32 in which the contents of the information field 53 generated by the communication control unit 1 are stored temporarily.

The communication control unit of the particular embodiment having the above configuration has the following features.

(1) The sending and receiving FIFOs 17 and 18 are provided between the line interface controller 14 and the DMAC 16 to separate the bus 102 used by the $\mu$CPU 11 from the paths 103 and 104 through which the sent and received data pass. Thus, the high-speed operation of the communication control unit is achieved without causing the $\mu$CPU 11 to wait for the occurrence of empty buses even if a frame is in transmission/reception. By the provision of the sending and receiving FIFOs, an instantaneous peak of a load created during successive reception of short frames is reduced and the generation of overrun and underrun errors will be prevented.

(2) By the provision of a bus 107 used only for instruction fetching between the $\mu$CPU 11 and the ROM 12, the $\mu$CPU 11 can access the internal bus 102 and at the same time read the next instruction from the ROM 12. Thus the speed at which the instructions are executed by the $\mu$CPU 11 and the speed at which the communication control is provided are increased.

The transmission of a communication frame in the system of the particular embodiment will be described on the basis of the above mentioned structure.

FIG. 3 is a flowchart of a program showing the procedures of transmission of a communication frame by the communication control unit 1 in accordance with the instruction from the high-ranking processor 2. The processor 2 stores data to be sent in the sending buffer 31 of the memory 3, and then delivers a transmission requirement via the bus 4 to the communication control unit 1. When the μCPU 11 of the communication control unit 1 receives the transmission requirement via the interface 15 and internal bus 102, it executes the program of FIG. 3. First, it uses the RAM 13 as a working area to generate the header portion 52 (an address field 52A and a control field 52B) of a communication frame 50 to be sent, and stores this data in the sending FIFO 17 via the internal bus 102 (step 111). The contents of the header portion 52 are autonomously generated by the μCPU 11 if the relationship between another communication system to be communicated and the communication control unit is determined unambiguosly. If otherwise, the μCPU 11 sets in the sending FIFO an address and a control field in accordance with the instruction from the high-ranking processor 2.

The μCPU 11 sets parameters such as the head address of the sending buffer 31 and the number of transfer bytes of the sending data in the DMAC 16 via the internal bus 102 (step 112), then gives an enable command to the DMAC 16 to thereby start the transfer of data from the sending buffer 31 to the sending FIFO 17 (step 113). It also gives an enable command to the line interface controller 14 to start the transmission, to the sending line 100a, of the contents of the sending FIFO read via the internal bus 102 (step 114).

Upon receiving the enable command, the line interface controller 14 first sends a bit pattern indicative of the frame starting flag 51 and then data read from the sending FIFO 17 sequentially.

The sending FIFO 17 includes a plurality of registers of (n+2) bits where the bit width of the data in the FIFO is n bits. One of two bits other than the data indicates that the data is the last frame data (hereinafter referred to as "final bit"). When the line interface controller 14 receives data of the "1" final bit, it sends a FCS 54 and a frame end flag 55 to thereby terminal the transmission.

The remaining one bit indicates the occurrence of an error in the DMAC 16 (hereinafter referred to as "abort bit"). When the line interface controller 14 receives data of the "1" abort bit, it sends at least seven "1's" successively subsequent to the data in transmission in order to indicate that the sent frame is invalid to thereby terminate the transmission.

The enable commands from the μCPU 11 to the DMAC 16 include a final enable one and a not final enable one. If the enable command from the μCPU 11 is the final enable one, the DMAC 16 sets the final bit at "1" only in the final data in the data transmission and stores the final data in the sending FIFO 17. If the enable command from μCPU 11 is a not final enable one, the final bit of data stored in the sending FIFO 17 is nullified necessarily.

When the information field 53 of the sent frame is obtained from one sending buffer in the sending buffer area 31, the μCPU 11 gives an enable command to the DMAC 16 for finally enabling purposes. On the other hand, when one data field is long and obtained from two or more sending buffers in the sending buffer area 31, an enable command for final-enabling purposes is given only when data is read from the final buffer, and an enable command for not-final-enabling purposes is given when data is read from other sending buffers. As just described, by using the final bit, the μCPU 11 can by itself determine whether the data that the line interface controller 14 has read from the sending FIFO is the end of the information field even if the μCPU 11 does not give an instruction to the line interface controller 14.

If there is an empty area in the sending FIFO 17 and the data to be sent remains in the sending buffer 31, the DMAC 16 reads data automatically from the sending buffer 31 to the sending FIFO. If the sending FIFO is filled, the DMAC 16 temporarily stops data reading, which is restarted when there occurs an empty area in the sending FIFO 17, so that the data transmission from the sending buffer 31 to the sending FIFO 17 is performed without the intervention of the μCPU.

The transmission of a communication frame including the information field performed autonomously by the communication control unit in response to a signal from another communication system will be described.

FIG. 4 is a program flowchart showing the first embodiment of the transmission. The μCPU 11 generates the contents of the data field 53 to be included in the frame to be sent, and writes them in the working area 32 provided in memory 3 (step 201). In this case, the contents of the generated information field may be written temporarily in the RAM 13 and then transferred to the working area 32 using the DMAC 16.

The address field and control field of the information frame to be sent are prepared using the RAM 13 as the working area, and stored via the internal bus 102 in the sending FIFO 17 (step 202). Parameters for the head address of the working area 32, the number of transferred bytes, etc., are set in the DMAC 16 via the internal bus 102 (step 203), the DMAC 16 is enabled in order to transfer data from the working area 32 to the sending FIFO 17 (step 204), and an instruction is given to the line interface controller 14 to enable same for transmitting purposes (step 205). The line interface controller 14 and the DMAC 16 operate in the same manner as they send a communication frame in response to the instructions from the high-ranking processor 2.

According to the above embodiment, a frame of any length can be autonomously generated and sent without increasing a quantity of hardware necessary for the communication control unit 1 and the load to be processed by the μCPU 11.

While in the above embodiment the system is illustrated in which the address and control fields of a frame to be sent are stored in the sending FIFO 17, the address and control fields of a frame to be sent may be generated in the working area 32 without being stored in the sending FIFO 17 as will be described in a second embodiment shown below.

FIG. 5 is a flowchart showing the second embodiment of the process in which the communication control unit 1 autonomously generates and sends a frame including an information field. The μCPU 11 writes in the working area 32 provided in the memory 3 an address field, a control field and an information field of a frame to be sent (step 301). Alternatively, the address field, control field and information field may be beforehand written in the RAM 13, and then the DMAC 16 may be used to transfer to the working area 32 the information field generated via the internal bus 102 and the bus 4 as in the previous case. Parameters such as the head address of the working area 32 and the number of transfer bytes are set in the DMAC 16 via the internal bus 102 (step 302), and the DMAC 16 is enabled to transfer data from the working area 32 to the sending FIFO 17 (step 303). Finally, the line interface controller 14 is enabled via the internal bus 102 for transmitting purposes (step 304).

Also in the particular embodiment, a frame of any length may be generated and sent autonomously without increasing a quantity of hardware required for the communication control unit 1 and the load processed by μCPU 11.

While in the respective embodiments the line interface controller 14 has been described and illustrated as starting transmission in response to an instruction from the μCPU 11, it will be unnecessary to enable the line interface controller 14 in the flowchart of FIGS. 3-5 if it is arranged that the line interface controller 14 detects the storage of data in the sending FIFO 17 and starts to send a frame automatically.

While in the above embodiments the communication control unit 1 is described and illustrated as generating and sending autonomously a frame including an information field, the present invention may be applicable in the use of a frame including only an address field and a control field without an information field. The present invention may be also applicable to an instant in which the communication control unit 1 generates and sends the whole fields of a frame in accordance with an instruction from the high-ranking processor 2 without generating and sending a frame autonomously.

The present invention is especially advantageous where a limitation to a quantity of hardware in the communication control unit 1 is large as in the instant where the communication control unit 1 is fabricated on the same semiconductor substrate.

We claim:

1. A method of sending a communication frame for a communication system including:
   a main processor;
   a common memory connected to the main processor via a system bus for temporarily storing transmission data to be sent to a communication line and reception data received from the communication line; and,
   a communication control unit connected between the system bus and the communication line for reading the transmission data from the common memory and sending the transmission data to the communication line as a predetermined communication frame and for receiving an external communication frame from the communication line and writing reception data extracted from the external communication frame into the common memory;
   said communication control unit including a microprocessor, a direct memory access controller connected to the microprocessor and the system bus for accessing said common memory, a line interface controller connected between the microprocessor and the communication line and a buffer memory connected between the direct memory access controller and the line interface controller, said method comprising:
   in response to a signal from another communication system and without instruction from the main processor, autonomously generating by said microprocessor of data comprising at least a portion of an information field of a communication frame to be sent from the communication control unit and to be written in a predetermined area of the common memory;
   delivering to the direct memory access controller from the microprocessor a parameter for reading out the generated data stored in the common memory;
   reading out the generated data by the direct memory access controller from the common memory to the buffer memory on the basis of the parameter; and
   reading out the generated data by the line interface controller from the buffer memory and autonomously sending the data to the communication line in the form of the predetermined communication frame.

2. The method according to claim 1, further including a step of causing the microprocessor to provide the buffer means with data constituting a header portion of the communication frame before execution of the reading out by the direct memory access controller wherein the information field is read out from the buffer memory and said line interface controller sends the communication frame comprising the header portion to the communication line.

3. A communication system comprising:
   a communication control unit connected to a communication line to communicate communication frames with the communication line;
   a high-ranking processor connected to the communication control unit via a main bus; and
   common memory means connected to the main bus and accessible by the processor and the communication control unit for temporarily storing transmission data to be sent from the high-ranking processor to the communication line via the communication control unit and the reception data from the communication line to be delivered to the high-ranking processor by the communication control unit;
   the communication control unit comprising:
   a line interface controller connected to the communication line;
   a direct memory access controller connected to the main bus;
   buffer memory means connected between the direct memory access controller and the line interface controller;
   interface means connected to the main bus; and
   a microprocessor connected via an internal bus to the line interface controller, the direct memory access controller, the buffer memory means and the interface means;
   the microprocessor including:
   in response to a signal from another communication system and without instruction from the high-ranking processor, means for autonomously generating data comprising an information field of a communication frame to be sent from the communication control unit and for sending the generated data to the communication line for writing said data into a predetermined area of the common memory means; and,
   means for enabling the direct memory access controller to read out said generated data of the information field from the common memory means to the buffer memory means;
   wherein the line interface controller transmits the data in the buffer memory means to the communication line in a form of a predetermined communication frame.

4. The communication system according to claim 3, wherein the buffer memory means includes a FIFO buffer memory from which data is read out on a first-in first-out basis.

5. The communication system according to claim 3, wherein:
   the communication frame includes a first header field, the information field and a second header field;
   wherein the microprocessor includes means for writing in the common memory means the first header field and the information field; and,
   wherein the second header field is generated by the line interface controller.

6. The communication system according to claim 3, wherein:
   the communication frame includes a header field and the information field; and
   the microprocessor includes means for providing the buffer means with a first header information comprising a part of the header field; and the line interface controller includes means for generating a second header information comprising an other portion of the header field before and/or after the line interface controller reads data from the buffer means wherein the first and second information form the information field.

7. A method of sending a communication frame for a communication system including a main processor, a common memory connected to the main processor via a system bus for temporarily storing transmission data to be sent from the main processor to a communication line and reception data received from the communication line, and a communication control unit connected between the system bus and the communication line for transmitting data from the common memory to the communication line as a predetermined communication frame and for receiving communication frames from the communication line and then writing reception data extracted from the received communication frames into the common memory, said communication control unit including a microprocessor, a direct memory access controller connected to the microprocessor and the system bus for accessing said common memory, a line interface controller connected between the microprocessor and the communication line, said buffer memory connected between the direct memory access controller and the liner interface controller, said method comprising:
   in response to a signal from another communication system and without instruction from the main processor, writing in a predetermined area of the common memory data comprising an information field and a part of a header field of a communication frame which are generated autonomously by the communication control unit and which are sent autonomously to the communication line;
   delivering to the direct memory access controller from the microprocessor a parameter for reading out said data written in the common memory by the microprocessor;
   reading out said data from the predetermined area of the common memory into the buffer memory on the basis of the parameter by the direct memory access controller; and,
   reading out the data from the buffer memory and sending that data to the communication line in a form of a predetermined communication frame by the line interface controller.

8. The method according to claim 7, wherein the line interface controller transmits a piece of information comprising a part of the header field of the communication frame before and/or after the reading of the data from the buffer memory.

* * * * *